US012063532B2

(12) United States Patent
He et al.

(10) Patent No.: US 12,063,532 B2
(45) Date of Patent: Aug. 13, 2024

(54) PDCCH TRANSMISSION IN WIRELESS COMMUNICATIONS

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Jie Cui, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 17/593,736

(22) PCT Filed: Oct. 14, 2020

(86) PCT No.: PCT/CN2020/120926
§ 371 (c)(1),
(2) Date: Sep. 23, 2021

(87) PCT Pub. No.: WO2022/077278
PCT Pub. Date: Apr. 21, 2022

(65) Prior Publication Data
US 2022/0312240 A1    Sep. 29, 2022

(51) Int. Cl.
H04W 72/04    (2023.01)
H04L 1/00    (2006.01)
(Continued)

(52) U.S. Cl.
CPC .......... *H04W 24/08* (2013.01); *H04L 1/0003* (2013.01); *H04W 72/0446* (2013.01); *H04W 72/23* (2023.01)

(58) Field of Classification Search
CPC ..... H04W 24/08; H04W 72/20; H04W 72/23; H04W 72/0446; H04W 72/126;
(Continued)

(56) References Cited

U.S. PATENT DOCUMENTS

2019/0313383 A1   10/2019  Xiong et al.
2020/0053724 A1*   2/2020  MolavianJazi ....... H04L 5/0048
(Continued)

FOREIGN PATENT DOCUMENTS

CN    109644080    4/2019
CN    110324127    10/2019
(Continued)

*Primary Examiner* — Wei Zhao
(74) *Attorney, Agent, or Firm* — Fay Kaplun & Marcin, LLP

(57) ABSTRACT

A user equipment (UE) performs a multi-level Downlink Control Information (DCI) monitoring operation. The UE monitors an Anchor-search space set (SSS) of a first resource block (RB) set for downlink control information (DCI) and, when the Anchor-SSS includes DCI, monitors at least one Subordinate-SSS of a second RB set based on at least the DCI detected on the Anchor-SSS.

16 Claims, 5 Drawing Sheets

(51) Int. Cl.
*H04W 24/08* (2009.01)
*H04W 72/0446* (2023.01)
*H04W 72/23* (2023.01)

(58) Field of Classification Search
CPC .. H04W 72/044; H04L 1/0025; H04L 5/0053;
H04L 1/0003; H04L 5/005
See application file for complete search history.

(56) References Cited

U.S. PATENT DOCUMENTS

2021/0168779 A1* 6/2021 Mondal ................. H04L 5/0035
2022/0311588 A1* 9/2022 Golitschek Edler von Elbwart ...
H04L 5/0091

FOREIGN PATENT DOCUMENTS

| | | |
|---|---|---|
| CN | 111108803 | 3/2020 |
| CN | 111357389 | 6/2020 |
| CN | 111512575 | 8/2020 |
| EP | 3 609 109 | 2/2020 |
| EP | 3629662 | 4/2020 |
| WO | 2019099393 | 5/2019 |
| WO | 2019/192018 | 10/2019 |

* cited by examiner

PDCCH TRANSMISSION IN WIRELESS COMMUNICATIONS

BACKGROUND

In some networks, signaling between a user equipment (UE) and a cell of a network may be performed over the unlicensed spectrum. In 5G New Radio (NR) networks, this transmission in the unlicensed spectrum may be referred to as (NR-U). The unlicensed spectrum is shared by different devices using different communication protocols. Access to the unlicensed spectrum may implicate various regulations and/or standards. For instance, Listen-Before-Talk (LBT) may be implemented in accordance with these regulations and/or standards to access the unlicensed spectrum for communications.

When operation on a 5G network, UEs are required to operate over a full system bandwidth (e.g. 100 MHz for some frequency bands). For Rel-16 NR-U Physical Downlink Control Channel (PDCCH) monitoring, the UE is required to monitor all of search space sets (SSS) configured by higher layers if resource block (RB) set availability information is not known. However, when there is a LBT failure, the cell may not transmit PDCCH candidates in all the configured SSS. Thus, the UE may be monitoring SSS where there is no PDCCH candidates leading to a large amount of power consumption by the UE for no purpose.

SUMMARY

Some exemplary embodiments are related to a processor configured to perform operations. The operations include monitoring an Anchor-search space set (SSS) of a first resource block (RB) set for downlink control information (DCI) and when the Anchor-SSS includes DCI, monitoring at least one Subordinate-SSS of a second RB set based on at least the DCI detected on the Anchor-SSS.

Other exemplary embodiments are related to user equipment (UE) including a transceiver configured to communicate with multiple networks and a processor communicatively coupled to the transceiver and configured to perform operations. The operations include monitoring an Anchor-search space set (SSS) of a first resource block (RB) set for downlink control information (DCI) and when the Anchor-SSS includes DCI, monitoring at least one Subordinate-SSS of a second RB set based on at least the DCI detected on the Anchor-SSS.

Still further exemplary embodiments are related to a processor configured to perform operations. The operations include encoding an Anchor-search space set (SSS) of a first resource block (RB) set with downlink control information (DCI), encoding at least one Subordinate-SSS of a second RB set based on at least the DCI and transmitting the first RB set and the second RB set.

DETAILED DESCRIPTION

Figure 1:
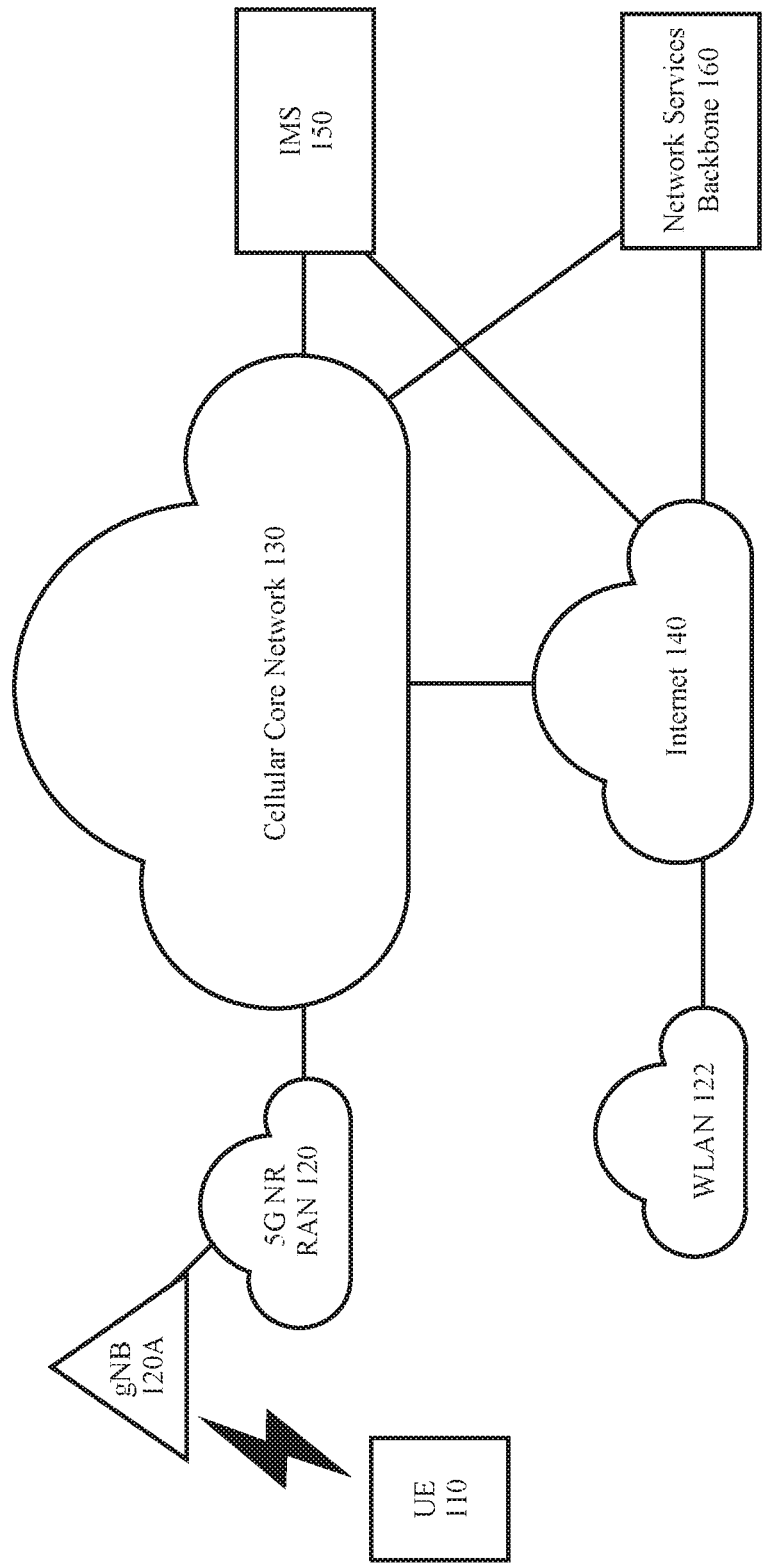
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe devices, systems and methods for implementing multi-level Downlink Control Information (DCI) monitoring by a user equipment (UE).

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to the UE communicating with a 5G New Radio (NR) network that is capable of operating in the unlicensed spectrum. However, reference to a 5G NR network is merely provided for illustrative purposes. The exemplary embodiments may apply to any type of network operating in the unlicensed spectrum.

The unlicensed spectrum is a shared transmission medium that may be used by a plurality of different devices utilizing a plurality of different communication protocols. Access to the unlicensed spectrum for 5G NR purposes may implicate various regulations and/or standards. For instance, Listen-Before-Talk (LBT) may be implemented in accordance with these regulations and/or standards to access the unlicensed spectrum for communications. LBT may relate to determining whether channels in the unlicensed spectrum are occupied by other signals prior to performing a transmission over the unlicensed spectrum.

The exemplary embodiments relate to a multi-level Downlink Control Information (DCI) monitoring by a user equipment (UE). In the exemplary embodiments, a first SSS of a first RB set is monitored for DCI. The DCI in the first SSS may then be used to identify further SSSs of other RB sets that are to be monitored. In addition, if there is no DCI in the first SSS or the DCI of the first SSS does not identify the further SSSs, the UE will understand that the further SSSs do not need to be monitored. The exemplary embodiments will be described in greater detail below.

FIG. 1 shows a network arrangement 100 according to various exemplary embodiments. The network arrangement 100 includes the UE 110. Those skilled in the art will understand that the UE 110 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may be configured to communicate directly with one or more networks. In the example of the network arrangement 100, the UE 110 may wirelessly communicate with a 5G new radio (NR) radio access network (5G NR RAN) 120 and a wireless local access network (WLAN)

122. The 5G NR RAN 120 may be configured to operate in the unlicensed spectrum. The UE 110 may also communicate with other types of networks (e.g., 5G cloud RAN, a next generation RAN (NG-RAN), an LTE RAN, a legacy RAN etc.). The UE 110 may also communicate with networks over a wired connection. Therefore, the UE 110 may include a 5G NR chipset to communicate with the 5G NR RAN 120 and an ISM chipset to communicate with the WLAN 122.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 122 may include any type of wireless local area network (WiFi, Hot Spot, IEEE 802.11x networks, etc.).

The UE 110 may connect to the 5G NR RAN 120 via a cell 120A. Those skilled in the art will understand that any association procedure may be performed for the UE 110 to connect to the 5G NR RAN 120. For example, as discussed above, the 5G NR RAN 120 may be associated with a particular network carrier where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., the cell 120A of the 5G NR RAN 120). As mentioned above, the use of the 5G NR RAN 120 is for illustrative purposes and any type of network may be used. For example, the UE 110 may also connect to the LTE-RAN (not pictured) or the legacy RAN (not pictured).

The cell 120A may be equipped with one or more communication interfaces. For example, the cell 120A may be equipped with a communication interface that is configured to communicate with UEs over the unlicensed spectrum. Further, the cell 120A may be configured with various processing components that are configured to perform various operations such as, but not limited to, receiving signals from UEs and other network components, processing received signals and generating signals for transmission. For example, the cell 120A may be equipped with one or more processors. The processors may include one or more processors and/or one or more applications processors. These processors may be configured to execute software and/or firmware. In another example, the cell may be equipped with an integrated circuit with or without firmware. For example, the integrated circuit may include input circuitry to receive signals, processing circuitry to process the signals and other information and output circuitry to output generated signals and information to other components (e.g., a communication interface, a transceiver, etc.). The functionality described herein for the cell 120A may be implemented in any of these or other configurations known in the art for a cell of a network.

In addition to the networks 120 and 122 the network arrangement 100 also includes a cellular core network 130. The cellular core network 130 may be considered to be the interconnected set of components that manages the operation and traffic of the cellular network. The network arrangement 100 also includes the Internet 140, an IP Multimedia Subsystem (IMS) 150, and a network services backbone 160. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
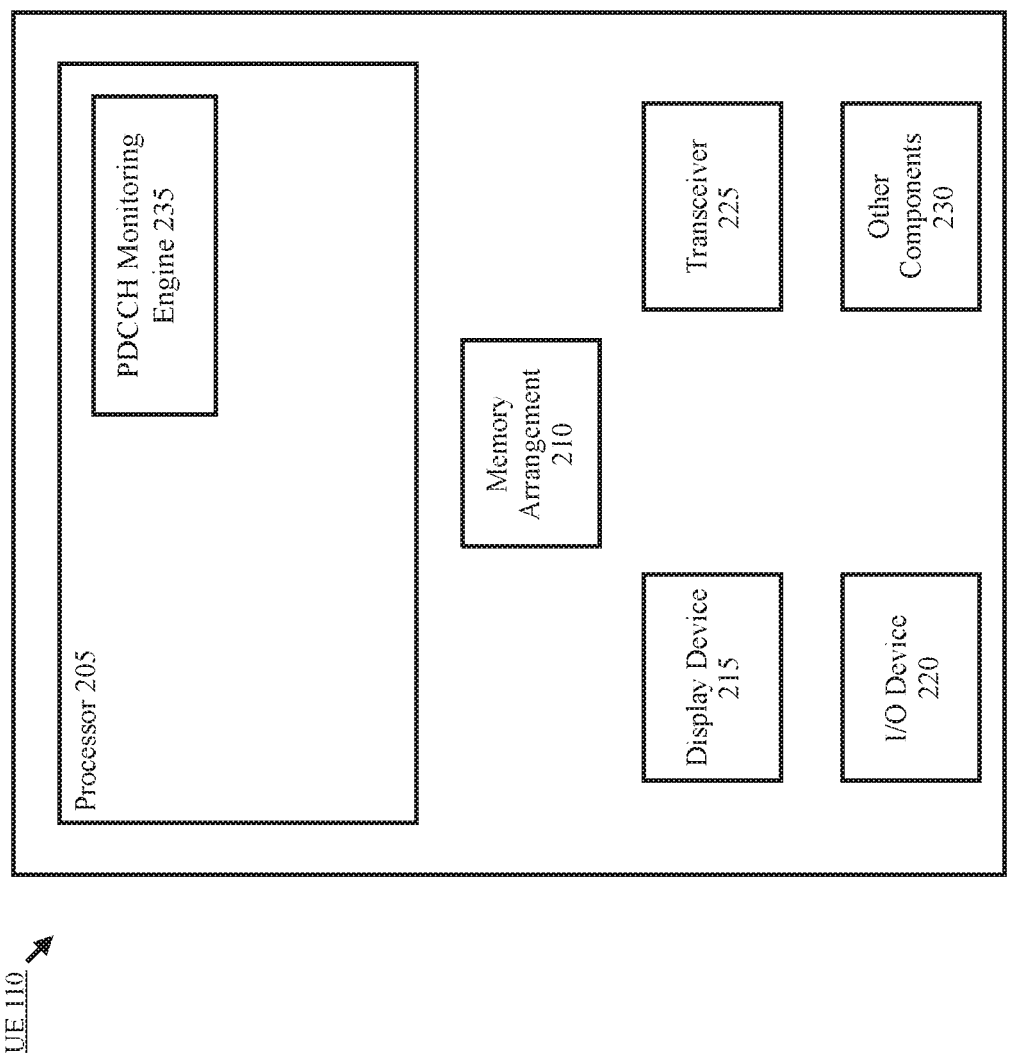
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a PDCCH monitoring engine 235. The PDCCH monitoring engine 235 may perform various operations related to the multi-level Downlink Control Information (DCI) monitoring of the exemplary embodiments.

The above referenced engine each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and the WLAN 122. Accordingly, the transceiver 225 may operate on a variety of different frequencies or channels (e.g., set of consecutive frequencies).

Figure 3:
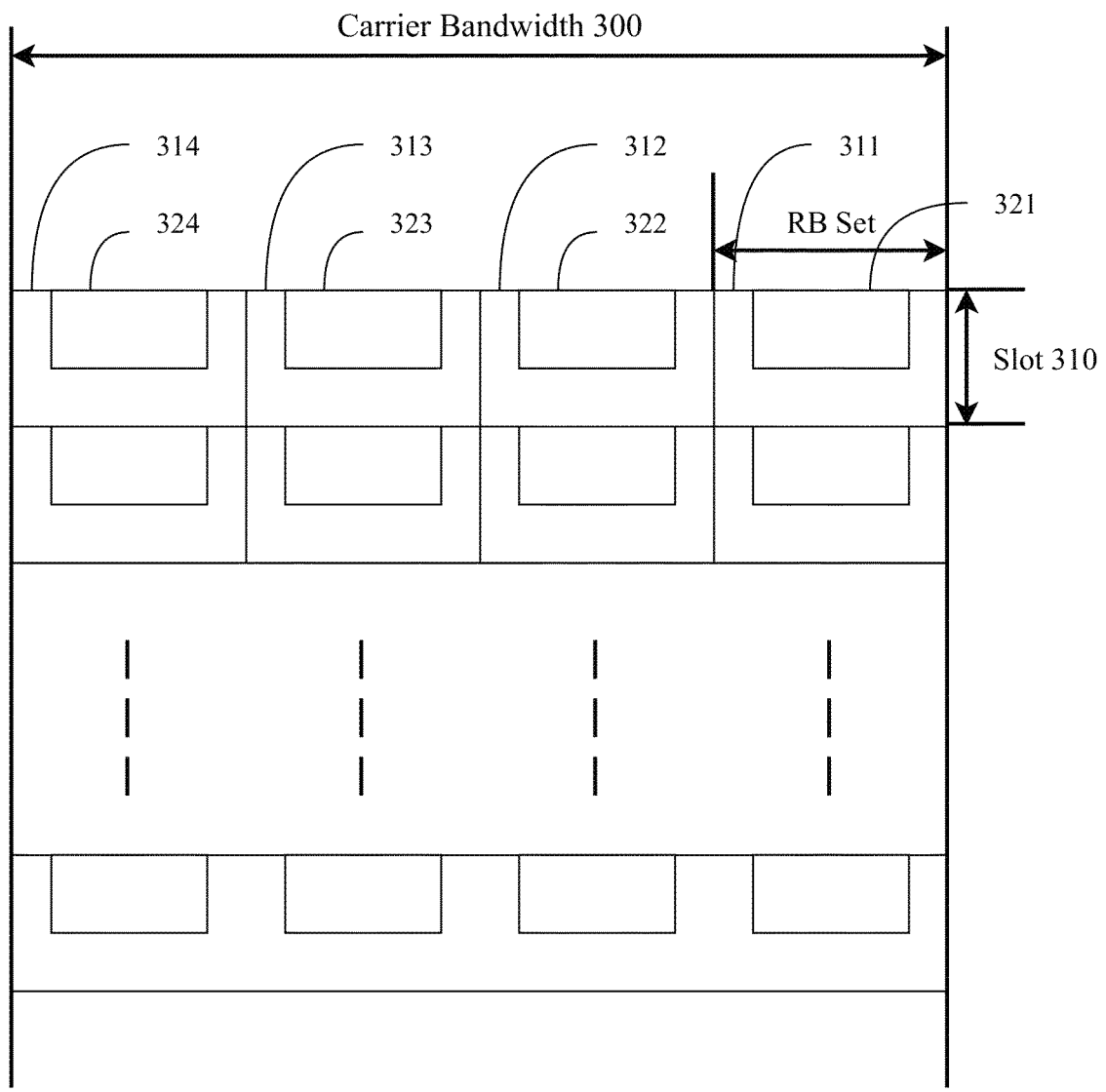
FIG. 3 shows search space sets (SSS) without DCI transmissions due to LBT failures at the cell side.

FIG. 3 shows search space sets (SSS) without DCI transmissions due to LBT failures at the cell side. As described above, UEs operating on 5G networks are required to operate over a full system bandwidth 300 (e.g. 100 MHz for some frequency bands). For Rel-16 NR-U PDCCH monitoring, the UE is required to monitor all of search space sets configured by higher layers if resource block (RB) sets availability information is not known at the UE side, e.g., the UE is not configured with DCI Format 2_0 or configured but the DCI Format is not detected due to LBT failure at the cell side.

FIG. 3 illustrates such a failure. It may be considered in FIG. 3 that each column represents a slot, e.g., slot 310. In this example, each slot comprises four (4) Resource Block (RB) sets, e.g., RB sets 311-314. Each of the RB sets include configured SSS, e.g., SSS 321 of RB set 311, SSS 322 of RB set 312, SSS 323 of RB set 313 and SSS 324 of RB set 314. As described above, the UE needs to monitor PDCCH candidates in all the configured SSS 321-324. However, in this example, the cell (e.g., gNB 120A) may have experienced an LBT failure when attempting to access the transmission medium in the unlicensed spectrum. In such a case, no PDCCH candidates would have actually been transmitted by the gNB on the cell in the SSS 321-324 because of the LBT failure. However, the UE will continue to monitor all the SSS 321-324 even though there are no PDCCH candidates causing the UE a large amount of power consumption for monitoring PDCCH candidates that is not transmitted at the gNB.

Figure 4:
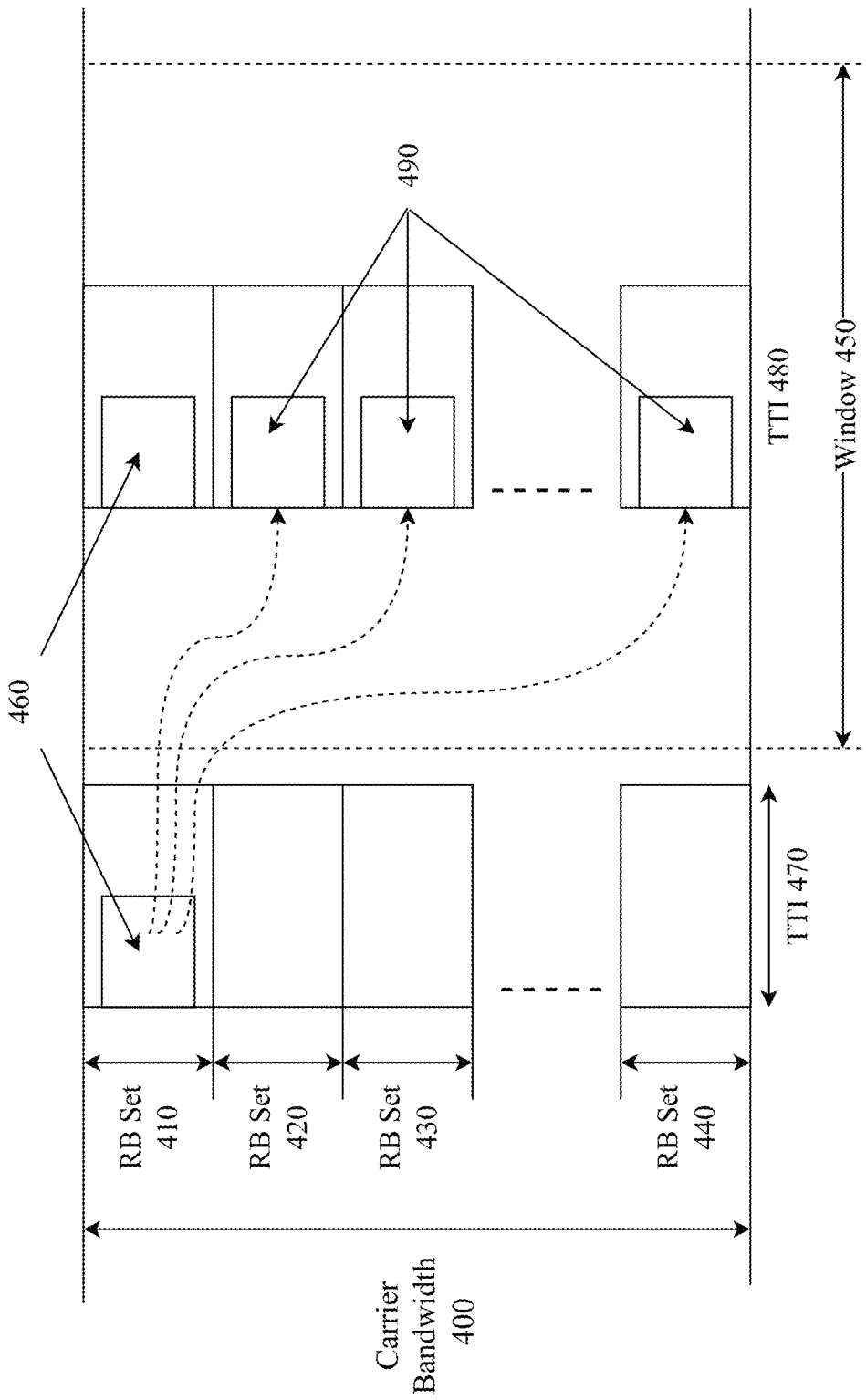
FIG. 4 shows an example of multi-level DCI monitoring according to various exemplary embodiments.

FIG. 4 shows an example of multi-level DCI monitoring according to various exemplary embodiments. In some exemplary embodiments, the UE 110 may be configured with a set of RB sets 410-440 for a downlink (DL) carrier 400. Each RB set may be defined by a start and an end RB index. In addition, each RB set may have the same number of RBs or may have differing numbers of RBs.

The UE 110 may also be configured with a set of UE-specific PDCCH SSSs that are divided into two types. The first type are termed an Anchor Search Space Set (Anchor-SSS) as illustrated in FIG. 4 as Anchor-SSSs 460. The second type are termed Subordinate Search Space Sets (Subordinate-SSS) as illustrated in FIG. 4 as Subordinate-SSSs 490. According to some exemplary embodiments, to save power for the UE 110 during PDCCH monitoring, the presence of the Subordinate-SSSs 490 may be dynamically indicated by the DCI transmitted in the Anchor-SSS 460. For example, if there is no DCI detected in the Anchor-SSS 460, the UE 110 will understand that there is no need to monitor the Subordinate-SSSs 490 because there will be no PDCCH information in those SSSs. On the other hand, if the Anchor-SSS 460 includes DCI information, the UE 110 will understand, from this DCI information, whether to monitor one or more of the Subordinate-SSSs for PDCCH information.

In some exemplary embodiments, the Subordinate-SSS 490 may be configured in RB sets having larger number of RBs as compared to the Anchor-SSS 460, e.g., the bandwidth of RB sets 420-440 may be larger than the bandwidth of RB set 410. This may be beneficial from a power saving perspective because the UE 110 may not monitor the Subordinate-SSSs on the other RB sets until the UE 110 receives the presence indicator for the subordinate-SSSs by the corresponding DCI transmitted in Anchor-SSS 460. Thus, the UE 110 may camp on a smaller bandwidth RB set (e.g., RB set 210) to reduce power consumption in the case of low load traffic.

Figure 5:
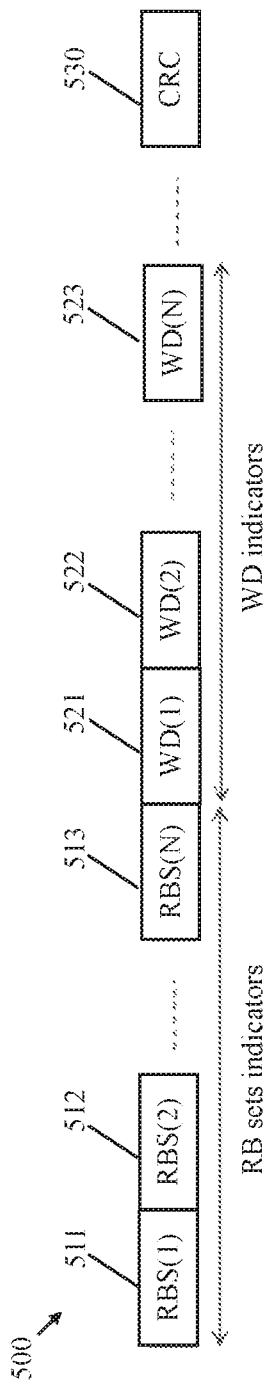
FIG. 5 shows an exemplary DCI format for an Anchor-SSS according to various exemplary embodiments.

FIG. 5 shows an exemplary DCI format 500 for an Anchor-SSS according to various exemplary embodiments. The DCI Format 500 in the Anchor-SSS 460 may include information to indicate the presence or absence of Subordinate-SSS across the RB sets. For example, as shown in FIG. 5, the DCI format 500 may include an RB set Indicator 1 (RBS(1)) 511, RBS(2) 512, . . . , RBS(N) 513. Each of these fields may indicate the presence or absence of a PDCCH information in a corresponding Subordinate-SSS. For example, it may be considered that RBS(1) 511 of the DCI format 500 corresponds to the RB set 420 of FIG. 4. Thus, this field RBS(1) 511 may indicate whether the UE 110 should monitor the configured Subordinate-SSS 490 of the RB set 420.

In addition, the exemplary DCI format 500 may also include the corresponding window durations to indicate the windows in which the UE 110 should monitor for the Subordinate-SSSs. In the exemplary DCI format 500, the window durations are shown as Window Duration 1 (WD(1)) 521, WD(2) 522, . . . WDF(N) 523. Referring back to FIG. 4, it can be seen that the first slot may be included in a first Transmission Time Interval (TTI) 470 and the second slot may be included in a second TTI 480. The second TTI 480 is shown as being included in the window 450. Thus, it is possible for the Anchor-SSS 460 in the TTI 470 to indicate that the Subordinate-SSSs 490 of the TTI 480 should be monitored. This indication may be provided by the window durations of the DCI format 500. Thus, to carry through with the example started above, it may be considered that RBS(1) 511 of the DCI format 500 corresponds to the RB set 420 of FIG. 4. The WD(1) 521 may also correspond to the RB set 420. Thus, the DCI that is included in Anchor-SSS 460 in the TTI 470 may indicate that the Subordinate-SSS of RB-Set 420 should be monitored (e.g., using the RBS(1) 511 field of DCI format 500) and that the monitoring of the Subordinate-SSS of RB-Set 420 should take place during the window 450 (e.g., using the WD(1) 521 field of DCI format 500).

In some exemplary embodiments, different fields of WD Information Elements (IEs) may be configured by higher layers to indicate the window duration 450 for different carriers. In such a scenario, the DCI formats in the Anchor-SSS 260 may control not only the serving cell where it is located but also signal the Subordinate-SSS monitoring on other serving cells.

As also shown in FIG. 5, the DCI format 500 may also include a Cyclic Redundancy Check (CRC) that may be scrambled by a cell Radio Network Temporary Identifier (C-RNTI) or a dedicated RNTI that targets a group of UEs.

In some exemplary embodiments, a gap from the last symbol of the Anchor-SSS 260 (e.g., of TTI 470) to the first symbol of the time window 450 for the corresponding Subordinate-SSS monitoring may be fixed by standard (e.g., the 3GPP depending on the PDCCH numerology. In other exemplary embodiments, there may be a set of values for the gap and one of the values may be reported as part of the UE 110 capability signaling.

Figure 6:
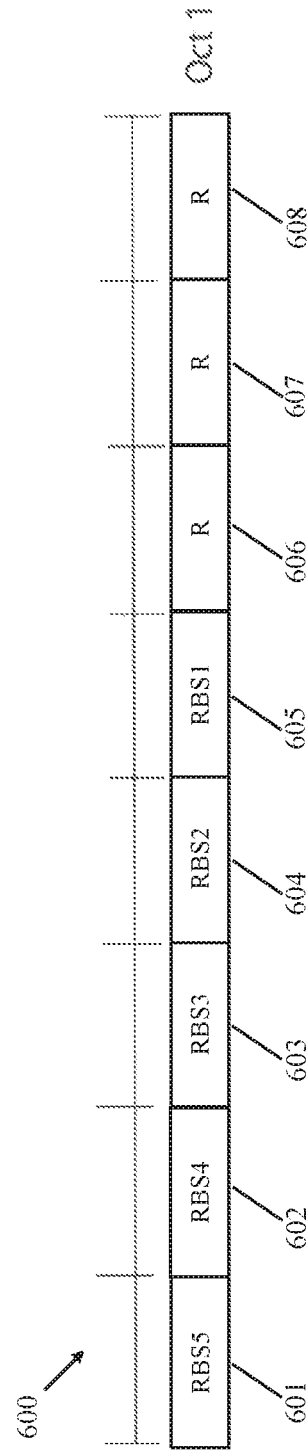
FIG. 6 shows an exemplary Medium Access Control-Control Element (MAC-CE) for Anchor RB set activation and deactivation according to various exemplary embodiments.

FIG. 6 shows an exemplary Medium Access Control-Control Element (MAC-CE) 600 for Anchor RB set activation and deactivation according to various exemplary embodiments. The MAC-CE 600 may be used to activate or deactivate an RB set for Anchor-SSS monitoring (termed as "Anchor-RB-set"). For example, the cell (e.g., gNB 120A) may switch the Anchor-RB-set from RB set 410 to 420 based on, for example, the Received Signal Strength Indicator (RSSI) reporting, interference status or any other channel quality metric reported by the UE 110.

The Anchor-RB-set MAC-CE 600 may be a fixed size, e.g., one octet as shown in FIG. 6. The Anchor-RB-set MAC-CE 600 may be identified by a MAC sub-header with a dedicated logical channel identification (LCID). The fields $RBS_i$ of the Anchor-RB-set MAC-CE 600 (e.g., fields 601-605) as shown in FIG. 6 may be used to indicate which RB set is selected as Anchor-RB-set. For example, an $RBS_i$ field set to 1 may indicate the RB set with RBS index i is selected as Anchor-RB-set for Anchor-SSS monitoring. Conversely, an $RBS_i$ field set to 0 may indicate the RB set with RBS index i is not selected as Anchor-RB-set. The remaining bits (R) 606-608 may be reserved for future use.

As described above, in some exemplary embodiments, the Anchor-SSS 460 may be configured to be monitored in a different TTI 470 compared to the TTI 480 for the Subordinate-SSS 490 monitoring. Moreover, the UE 110 may not be required to monitor the Anchor-SSS 460 during the indicated window 450, e.g., the Anchor-SSS 460 of TTI 470 may indicate that the Anchor-SSS 460 of the TTI 480 does not need to be monitored.

The set of IEs that may be included in a first DCI Format transmitted in the Anchor-SSS 460 may include, for example, a size and/or content of DCI formats transmitted in the associated Subordinate-SSS 490 within the indicated window. In one example, four DCI formats/sizes may be preconfigured by Radio Resource Control (RRC) signaling or may be defined in standards (e.g., 3GPP standards). One of four DCI formats/sizes in the Subordinate-SSS 490 may be dynamically indicated by a 2-bit IE in the DCI Format in the Anchor-SSS 460.

Other exemplary information that may be included in the IEs of the first DCI Format transmitted in the Anchor-SSS 460 may include a basic Modulation and Coding Scheme (MCS), a Rank Indicator (RI), aggregation levels that the UE 110 is to monitor the corresponding DCI formats in the associated Subordinate-SSSs 490.

In some exemplary embodiments, the fields in a second DCI Format transmitted in the Subordinate-SSSs 490 may include, for example, frequency domain resource allocation (FDRA), time domain resource allocation (TDRA), MCS update information, Hybrid Automatic Repeat Request (HARQ) information (e.g., PDSCH-to-HARQ feedback timing, HARQ process number, new data indictor (NDI), Redundancy version (RV), etc.), Transmit Power Control (TPC) command for the Physical Uplink Shared Channel (PUSCH) or the Physical Uplink Control Channel (PUCCH), etc.

In some exemplary embodiments, the UE 110 may monitor the second DCI on Subordinate-SSS based on the size and aggregation levels indicated by the first DCI format detected on the Anchor-SSS. In addition, the UE 110 may determine the PDSCH/PUSCH scheduling based on both the first DCI Format transmitted in the Anchor-SSS 460 and the second DCI Formats transmitted in the corresponding Subordinate-SSS 4.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor configured to perform operations comprising:
    monitoring an Anchor-search space set (SSS) of a first resource block (RB) set for downlink control information (DCI); and
    when the Anchor-SSS includes the DCI, monitoring at least one Subordinate-SSS of a second RB set based on at least the DCI detected on the Anchor-SSS, wherein a gap from a last symbol of the Anchor-SSS to a first symbol of a time window corresponding to the Subordinate-SSS is one of defined by a standard based on a Physical Downlink Control Channel (PDCCH) numerology or is reported as part of a UE capability signaling.

2. The processor of claim 1, wherein the operations further comprise: when the Anchor-SSS does not include the DCI, omitting monitoring corresponding Subordinate-SSSs.

3. The processor of claim 1, wherein the DCI comprises an RB Set Indicator indicating whether the subordinate-SSS in the second RB set needs to be monitored for PDCCH information and a window duration indicating a time window in which the UE needs to monitor the subordinate-SSS in the second RB set for PDCCH reception.

4. The processor of claim 3, wherein a cyclic redundancy check (CRC) of the DCI is scrambled by one of a cell Radio Network Temporary Identifier (C-RNTI) or a dedicated RNTI for a group of UEs.

5. The processor of claim 3, wherein the window duration indicates window durations for different carriers.

6. The processor of claim 1, wherein the first RB set has fewer resource blocks than the second RB set.

7. The processor of claim 1, wherein the operations further comprise:
    decoding a Medium Access Control-Control Element (MAC-CE), wherein the MAC-CE includes an indication of the first RB set that includes the Anchor-SSS.

8. The processor of claim 1, wherein the DCI of the Anchor-SSS comprises one of a size of DCI formats transmitted in the Subordinate-SSS, a content of DCI formats transmitted in the Subordinate-SSS, a basic Modulation and Coding Scheme (MCS), a Rank Indicator (RI), or aggregation levels to monitor the corresponding DCI formats in the Subordinate-SSS.

9. The processor of claim 1, wherein a DCI of the Subordinate-SSS comprises one of a frequency domain resource allocation (FDRA), a time domain resource allocation (TDRA), an MCS update information, Hybrid Automatic Repeat Request (HARQ) information, or a Transmit Power Control (TPC) command.

10. A user equipment (UE), comprising:
    a transceiver configured to communicate with a network; and a processor communicatively coupled with the transceiver and configured to perform operations comprising:

monitoring an Anchor-search space set (SSS) of a first resource block (RB) set for downlink control information (DCI); and when the Anchor-SSS includes the DCI, monitoring at least one Subordinate-SSS of a second RB set based on at least the DCI detected on the Anchor-SSS, wherein a gap from a last symbol of the Anchor-SSS to a first symbol of a time window corresponding to the Subordinate-SSS is one of defined by a standard based on a Physical Downlink Control Channel (PDCCH) numerology or is reported as part of a UE capability signaling.

11. The UE of claim 10, wherein the operations further comprise: when the Anchor-SSS does not include the DCI, omitting monitoring corresponding Subordinate-SSSs.

12. The UE of claim 10, wherein the DCI comprises an RB Set Indicator indicating whether the subordinate-SSS in the second RB set needs to be monitored for PDCCH information and a time window duration indicating a window in which the UE needs to monitor the subordinate-SSS in the second RB set for PDCCH reception.

13. The UE of claim 10, wherein the first RB set has fewer resource blocks than the second RB set.

14. The UE of claim 10, wherein the operations further comprise:

decoding a Medium Access Control-Control Element (MAC-CE), wherein the MAC-CE includes an indication of the first RB set that includes the Anchor-SSS.

15. A processor configured to perform operations comprising:

encoding an Anchor-search space set (SSS) of a first resource block (RB) set with downlink control information (DCI), wherein the DCI comprises an RB Set Indicator indicating whether the second RB set includes PDCCH information and a window duration indicating a window in which the second RB set is located;

scrambling a cyclic redundancy check (CRC) of the DCI by one of a cell Radio Network Temporary Identifier (C-RNTI) or a dedicated RNTI for a group of user equipments (UEs);

encoding at least one Subordinate-SSS of a second RB set based on at least the DCI; and generating, for transmission to the group of UEs, the first RB set and the second RB set.

16. The processor of claim 15, wherein the window duration indicates window durations for different carriers.

* * * * *